United States Patent [19]

Beauviala et al.

[11] Patent Number: 4,659,198

[45] Date of Patent: Apr. 21, 1987

[54] PROCESS AND SYSTEM FOR INSCRIPTION OF CODED INFORMATION ON THE MARGINAL PART OF A PERFORATED CINEMATOGRAPHIC FILM, AND FOR READING THIS INFORMATION

[75] Inventors: Jean-Pierre Beauviala, Grenoble; Jean-Pierre Charras, Brignoud, both of France

[73] Assignee: Societe anonyme dite: AATON RG., Grenoble, France

[21] Appl. No.: 784,896

[22] Filed: Oct. 7, 1985

[30] Foreign Application Priority Data

Oct. 8, 1984 [FR] France ................. 84 15391

[51] Int. Cl.⁴ ............................. G03B 21/50
[52] U.S. Cl. ........................... 352/92; 355/40
[58] Field of Search .............. 355/40, 41; 352/92

[56] References Cited

U.S. PATENT DOCUMENTS

| | | | |
|---|---|---|---|
| 3,885,866 | 5/1975 | Stearns | 355/41 |
| 4,215,920 | 8/1980 | Butler | 352/92 |
| 4,491,399 | 1/1985 | Bell | 352/92 |
| 4,504,130 | 3/1985 | Bell et al. | 352/92 |
| 4,519,701 | 5/1985 | Kanaoka et al. | 355/40 |
| 4,553,833 | 11/1985 | Kanaoka et al. | 355/40 |

FOREIGN PATENT DOCUMENTS 2413682  7/1979  France .
2026187  1/1980  United Kingdom .

*Primary Examiner*—Monroe H. Hayes
*Attorney, Agent, or Firm*—Sandler & Greenblum

[57] ABSTRACT

A system of inscription on the marginal part of a perforated cinematographic film, of coded information and for reading this information, comprises, for inscription, an assembly of a plurality of light sources adjacent one another, disposed transversely opposite the marginal part of the cinematographic film. A write-in device selectively controls at each instant, the lighting of certain light sources, from among all of them, for the inscription on the film, in coded form, of a plurality of dots aligned transversely in a column. The system also comprises, for reading the coded information inscribed on the film, an assembly of photo-sensitive elements, adjacent one another, extending transversely opposite the marginal part of the film bearing the coded information. Means and provided for recognizing and identifying the combinations of dots inscribed on the film and corresponding to the various characters of information.

22 Claims, 4 Drawing Figures

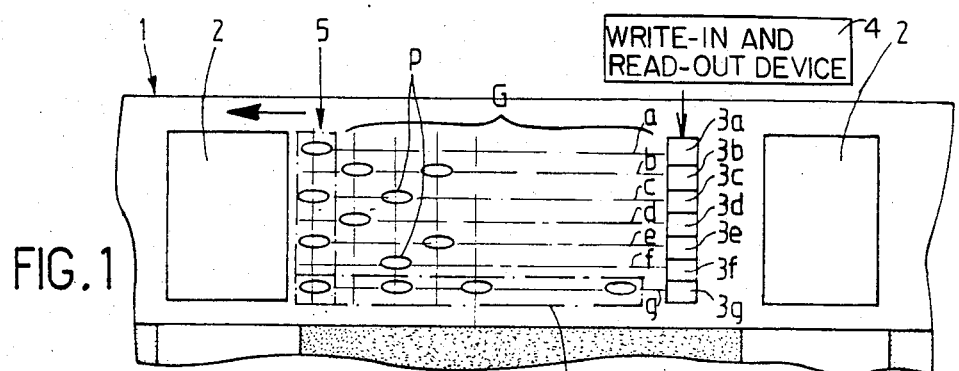
FIG. 1
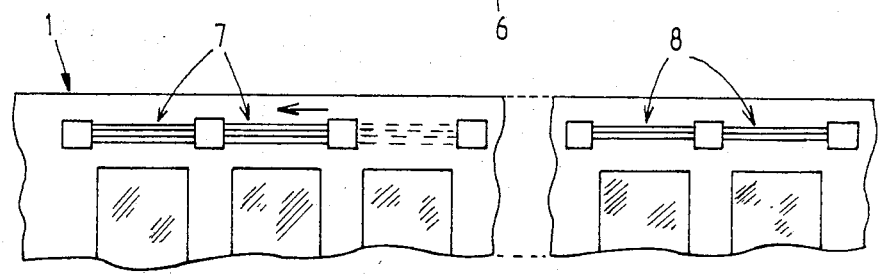
FIG. 2
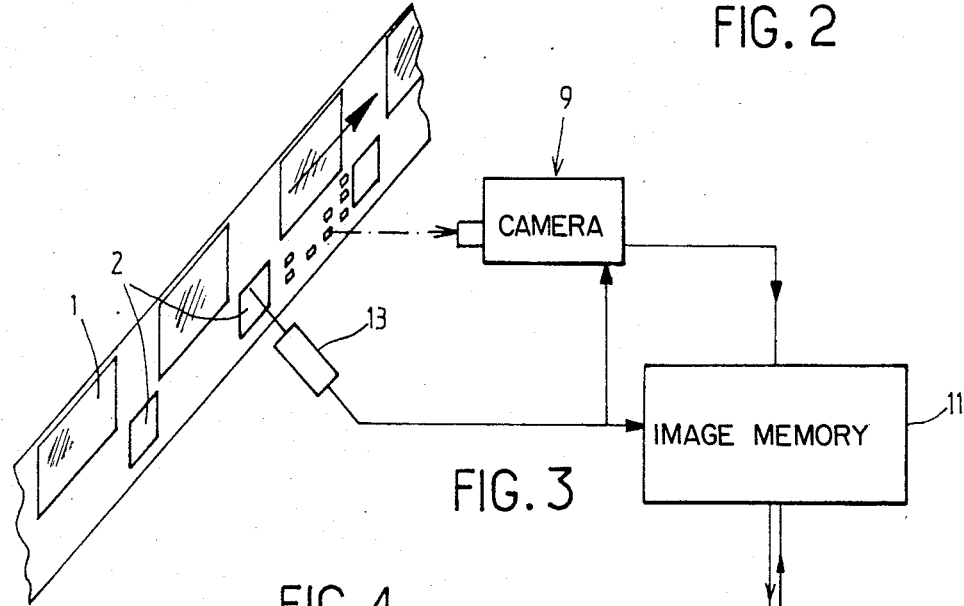
FIG. 3
FIG. 4
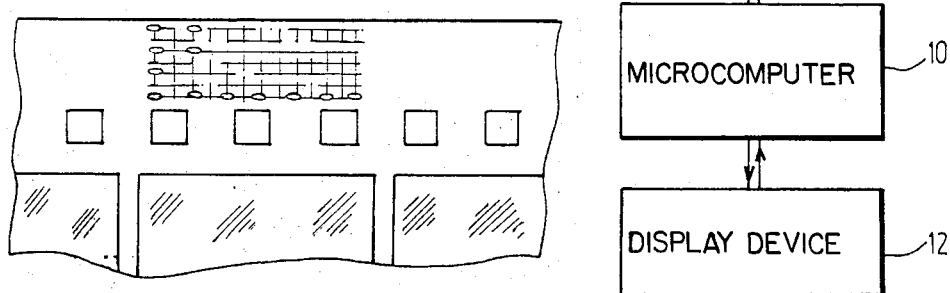

PROCESS AND SYSTEM FOR INSCRIPTION OF CODED INFORMATION ON THE MARGINAL PART OF A PERFORATED CINEMATOGRAPHIC FILM, AND FOR READING THIS INFORMATION

BACKGROUND OF THE INVENTION

The present invention relates to a process and system for inscription of coded information on the marginal part of a perforated cinematographic film, and for reading this information.

It is current practice to record, on the marginal part of a perforated cinematographic film, between the successive perforations in the case of 16 mm film, or outside these perforations, in the case of 35 mm film, information which is clear and/or in code, which corresponds to the conditions in which the corresponding sequences were filmed. This information may be relative, for example, to the time of the beginning and end of filming, to the camera, diaphragm and lens used, etc.

Up to the present time, this coded information was recorded in a predetermined matrix form and the information was read through a mask. This modus operandi brings about a linear distribution of the information which does not take into account the variation in speed of the film, in the course of its advance by one step, such variation being effected according to a substantially sinusoidal law. Consequently, the information must be inscribed when the film has stopped.

In another known system, a modulated signal may be continuously inscribed along the track, this signal being similar to a video signal.

None of these systems has proved satisfactory and they necessarily involve the use of relatively cumbersome and complex electronic means.

SUMMARY OF THE INVENTION

It is an object of the present invention to remedy these drawbacks by the provision of particularly simple means for inscribing the coded information on the moving film, allowing a non-linear and irregular geometry with respect to the edge of the film and to the perforations thereof, and enabling such information to be read without risk of errors.

To this end, this process for the inscription, on the marginal part of a perforated cinematographic film, of coded information in the form of dots disposed in a matrix of transverse columns and of longitudinal tracks, each transverse column of dots corresponding to a character of a group of information, is characterized in that, before each matrix of dots corresponding to a group of coded information, a first transverse framing pattern constituted by a unique combination of dots different from all the combinations corresponding to the different characters, is recorded, then in the course of inscription of the different successive characters constituting the same group of coded information, a second longitudinal framing pattern is recorded along a longitudinal track bordering the matrix, this second longitudinal framing pattern being constituted by alternating, along said track, dots and the absence dots aligned respectively with the various columns of the matrix in which the successive characters are inscribed.

The invention also relates to a system of inscription on the marginal part of a perforated cinematographic film, of coded information and for reading this information, comprising for inscription, an assembly of a plurality of light sources adjacent one another, disposed transversely opposite the marginal part of the cinematographic film, and a write-in device selectively controlling, at each instant, the lighting of certain light sources, from among all of them, for the inscription on the film, in coded form, of a plurality of dots aligned transversely in a column, and, for reading the coded information inscribed on the film, an assembly of photo-sensitive elements, adjacent one another, extending transversely opposite the marginal part of the film bearing the coded information, as well as means for recognizing and identifying the combinations of dots inscribed on the film and corresponding to the various characters of information.

The process and system offer the advantage that they make it possible to inscribe on the film the dots or optical "bits", corresponding to the various characters of information, in light, during the descent of the film, this leading to very simple optico-mechanical productions. Furthermore, they employ, for inscription, one single row of light sources, such as electro-luminescent diodes (for example seven in number) instead of employing a complete matrix. For reading, the device likewise comprises one single row of photosensitive elements (for example photodiodes), extending transversely and of which the number is much greater than that of the elements of the inscription device, in order to take into account a possible lateral displacement of the film.

BRIEF DESCRIPTION OF THE DRAWINGS

The invention will be more readily understood on reading the following description with reference to the accompanying drawings, in which:

FIG. 1 is a schematic plan view, on a large scale, of the perforated marginal part of 16 mm cinematographic film and of a device for inscribing coded information on this marginal part.

FIG. 2 is a schematic plan view of a portion of cinematographic film on the marginal part of which are inscribed the "flag", information marking the beginning and end of sequence.

FIG. 3 is a block diagram of the device for reading the coded information.

FIG. 4 is a plan view of the perforated marginal part, bearing coded information, of a 35 mm cinematographic film.

DESCRIPTION OF THE PREFERRED EMBODIMENTS

Referring now to the drawings, the system according to the invention which is shown in FIG. 1 is provided to inscribe, in the marginal part of a cinematographic film 1, 16 mm wide, coded information which corresponds to clear information relative to the filming of a sequence (for example the instant of the beginning and the end of a sequence, the diaphragm of the lens used, etc.) This coded information is inscribed in the space between two perforations 2 of the film. Each piece of information, corresponding to a character, is constituted by a plurality of clear spots or dots aligned in a transverse column and which may each take one of seven possible transverse positions indicated by a,b,c,d,e,f,g. The points of "elementary optical bits" may thus be distributed along longitudinal tracks a-g and these dots or "optical bits" are inscribed by means of an assembly of seven light sources 3a, 3b–3g forming an inscription assembly extending transversely opposite the marginal part of the film in which the perforations are provided. The light sources 3a,-3g may be constituted, for example, by electro-luminescent diodes. Elements 3a,-3g may also refer to a row of photo-sensitive elements such as photodiodes. These light sources 3a,-3g are connected to a write-in and read out device 4 so as to be energized and lit selectively at a given instant, depending on the character having to be inscribed on the film. For each character of information having to be inscribed on a transverse column of the film 1, a determined group or "pattern" of a plurality of electro-luminescent diodes is energized from among all the electro-luminescent diodes, this group corresponding to the "patterns" of the dots or "optical bits" having to be formed in the column in question. Such selective energization is effected under the control of the write-in device 4.

Each group of coded information G, constituted by a matrix of dots or "optical bits" p corresponding to the various characters of information constituting this group, is preceded by a transverse recognition or framing pattern 5 which is constituted, for example, by an assembly of seven bits 1010101 which corresponds to dots or "optical bits" inscribed on tracks a,c,e and g and absences of dots on intermediate tracks b, d and f. In other words the transverse framing pattern 5 is inscribed on the film 1 by energizing, from the write-in device 4, the electro-luminescent diodes 3a, 3c, 3e and 3g, and this before the inscription of the dots or "optical bits" corresponding to the information characters proper.

Furthermore, one of the longitudinal tracks bordering the matrix constituted by the group of coded information G, bears a longitudinal framing pattern 6. This pattern is constituted, for example, by an assembly of thirteen bits 1010101010101 corresponding to an alternating dots and the absence of dots along one of the lateral tracks for example of track g located inside, as shown in FIG. 1. For inscription of the longitudinal framing pattern 6, the end electroluminescent diode 3g, which is innermost, is therefore alternately lit and extinguished in the course of advance of the successive transverse columns opposite the electro-luminescent diodes, during inscription on the film.

It is therefore seen from the foregoing description that, if the assembly of dots or "optical bits" is distributed, including the framing patterns 5 and 6, in a matrix of seven longitudinal tracks and thirteen transverse columns, the first column is allocated to the transverse framing pattern 5 and one of the lateral tracks 6 is allocated to the longitudinal framing pattern, so that there remains a matrix of twelve columns and six tracks for the inscription of twelve characters proper constituting the coded information. The two framing patterns 5 and 6 are inscribed without any relation with the physical characteristics of the supporting film 1 (distance from the edge, position 1/1 or perforation and variation of the length of the bits inscribed).

In order to simplify and render more reliable decoding of the information inscribed, upon read-out thereof, there is inscribed, at every beginning and at every end of the "plan" (start or stop of the camera), a special "flag" pattern insensitive to the variations in speed of the camera, so as to initialize more easily the read-out and decoding device. As shown in FIG. 2, every beginning of plan or start of the camera may be indicated by the inscription, on the film 1, of the beginning of plan "flag" pattern 7 which may be constituted by four continuous drags between two successive perforations 2. Such drags may be obtained by permanently energizing, for example, electro-luminescent diodes 3a, 3c, 3e and 3g, during the passage of all of the zone included between two successive perforations 2. The "flag" pattern 8 marking the end of the plan or stopping the camera may be characterized by a different number of drags, for example three in number. These three drags may be obtained by the permanent energization of three electro-luminescent diodes spaced apart from one another in the assembly of diodes 3a–3g.

The device for reading the coded inscriptions, which is schematically shown in FIG. 3, comprises a camera 9, for example a camera of the type which scans the film and more particularly the marginal part thereof where the coded information is located. This scanning is synchronized with the advance of the film. Each group of coded information analysed by the camera 9 is converted into digital data of mean definition, for example of 256×256 pixels, each pixel being coded over a plurality of levels of grey, with a view toward analyzing the image of the matrix of each group of information by means of a microprocessor. Analysis is effected in two stages. Firstly, the positions of each center of the tracks and of the columns of the matrix comprising for example seven tracks and thirteen columns are first identified. Then, for each dot or "optical bit" of the matrix thus located, it is detected whether the dot is dark ("bit" 0) or light ("bit" 1), by comparison to a reference threshold. Identification of the position of each of the dots of the matrix is rendered possible by the camera and it is synchronized with the advance or the images. One and only one "matrix" to be decoded is therefore seen. The transverse framing pattern 5 and longitudinal framing pattern 6 make it possible to locate with precision the axes of the tracks and the columns as these patterns are selected so as to present, on each axis, either a maximum or a minimum of illumination.

Analysis of the high-definition digitalized image is effected by a microcomputer 10 in accordance with the conventional "shape recognition" techniques. In this image, the first column from the edge of the image is sought which presents four light dots, i.e. four maxims of illumination and which constitutes the right edge or the left edge of the group of information G depending on the optical device used. From the bottom of the image, the first tract is likewise sought which presents seven light dots located alternately with the absences of dots. Marking of the two framing patterns 5 and 6 does not need to be very precise and it is possible to calculate the position of the axes and the columns where dots p constituting the bits to be decoded (by precise determination of the position of the maxima and minima of illumination) are distributed. Decoding of the bits proper is itself elementary since, for each position determined previously, it suffices to detect whether the pixel in question is light or dark by measuring, in the image matrix, the value of each of these pixels.

The reading device comprises, between the camera 9 and the microcomputer 10, an image memory 11 which is a device for converting an image into digital data, known in robotics and image processing. The microcomputer 10 itself is associated with a display device 12 or with another device for exploiting the decoded signals.

The reading device also uses, as shown in FIG. 3, a synchronization device 13 which emits a reference signal for each image, this signal being applied to the camera 9 and to the image memory 11.

In the case of 16 mm film, the coded information is inscribed between two successive perforations 2, and mechanical devices (toothed wheels) or optical devices (photoelectric cells) may be used for detecting the position of the perforations 2 and for triggering the image acquisitions and decoding thereof.

On the other hand, in the case of 35 mm film, as shown in FIG. 4, the coded information is inscribed in the zone included between the edge of the film and the perforations 2, several of these perforations corresponding to one and the same image. In addition to the means described previously, in order to ensure synchronization, the fact that the information is distributed in blocks (matrices) separated by uniform black zones, may also be put to use. Synchronization may then be effected by means of a photo-electric cell or by the signal of the in-line CCD camera itself, since the beginning of each block gives rise to a sudden variation of the signal of the sensor which is easy to detect.

From the foregoing description, it follows that any information in coded form may be shown on the maginal part of a cinematographic film. However, other information may also be clearly inscribed in those parts of the film which are left free. The light dots or "optical bits" p may also be used for constituting per se, as a function of their positions on the film, characters appearing clearly and able to be identified by an observer. In other words, a group G of information may include an assembly of dots p clearly representing one or more alphanumeric characters.

We claim:

1. A process for the inscription, on the marginal part of a perforated cinematographic film, of coded information in the form of dots disposed in a matrix of transverse columns and of longitudinal tracks, each transverse column of dots consisting of a combinations corresponding to a different character in a group of information, comprising the steps wherein, before each matrix of dots corresponding to a group of coded information, a first transverse framing pattern is recorded consisting of a unique combination of dots different from all the combinations corresponding to the different characters, then in the course of inscription of the different successive characters constituting the same group of coded information, a second longitudinal framing pattern is recorded along a longitudinal track bordering the matrix, the second longitudinal framing pattern consisting of an alternating pattern, along said track, of dots and absences of dots aligned respectively with the various columns of the matrix in which the successive characters are inscribed.

2. The process according to claim 1, further comprising the step of inscribing on the film, at the beginning and at the end of each plan, that is when the camera starts and stops, a flag pattern consisting of a plurality of continuous drags between two perforations, the number of drags of the beginning of plan flag pattern being different from that of the end of plan flag pattern.

3. A process for inscribing coded information in a marginal portion of cinematographic film comprising the steps of:
   a. recording a first framing pattern comprising a unique pattern of dots;
   b. recording a matrix of dots comprising a plurality of columns and a plurality of tracks, said plurality of columns being transversely positioned with respect to the length of the film and said plurality of tracks being parallel with respect to the length of said film, each of said plurality of columns consisting of a pattern of dots which is different from said unique pattern of dots and which corresponds to a character in said coded information;
   c. recording a second framing pattern corresponding to one of said plurality of tracks, said second framing pattern consisting of a predetermined pattern of dots and the absence of dots aligned respectively with said plurality of columns in said matrix.

4. The process according to claim 3 wherein the step of recording said first framing pattern comprises the step of recording said unique pattern transversely with respect to the length of the film.

5. The process according to claim 3 wherein the step of recording said second framing pattern comprises the step of recording said second framing pattern in one of said plurality of tracks adjacent to an edge of said film.

6. The process according to claim 3 further comprising the step of recording a first flag pattern consisting of a plurality of continuous drags between two perforations in said film when a camera using said film is started.

7. The process according to claim 6 further comprising the step of recording a second flag pattern consisting of a plurality of continuous drags between two perforations in said film when said camera is stopped.

8. The process according to claim 7 wherein said first flag pattern is different from said second flag pattern.

9. A system for inscribing coded information on a marginal portion of a perforated cinematographic film and for reading said information, comprising:
   a. an inscription assembly comprising a plurality of light sources disposed adjacent to one another and transversely opposite to said marginal portion of said cinematographic film;
   b. a write-in device for selectively lighting certain ones of said light sources while the film is moving for inscribing a plurality of dots aligned transversely in a column, said plurality of dots representing coded information and comprising a first framing pattern, a matrix of dots and a second framing pattern, said first framing pattern being disposed perpendicular to the length of the film, said matrix comprising a plurality of columns disposed perpendicular to the length of the film and a plurality of tracks disposed parallel to the length of the film, and said second framing pattern corresponding to one of said tracks;
   c. an assembly for reading said coded information inscribed on said film comprising a plurality of photo-sensitive elements disposed adjacent to one another and extending transversely opposite to said marginal portion of said film bearing said coded information; and
   d. means for recognizing and identifying combinations of dots inscribed on said film which correspond to various characters of information.

10. The system according to claim 9 further comprising means for reading said coded information comprising:
   a. a camera for scanning said marginal portion;
   b. means for synchronizing the scanning of said marginal portion with advance of the film;
   c. an image memory connected to said camera and to said means for synchronizing for decoding signals from said camera;
   d. a microcomputer means connected to said image memory; and e. display means for displaying said decoded signals responsive to said microcomputer means.

11. A system for inscribing coded information in a marginal portion of cinematographic film comprising:
   a. means for recording a first framing pattern comprising a unique pattern of dots;
   b. means for recording a matrix of dots while the film is moving comprising a plurality of columns and a plurality of tracks, said plurality of columns being transversely positioned with respect to the length of the film and said plurality of tracks being parallel with respect to the length of the film, each of said plurality of columns consisting of a pattern of dots which is different from said unique pattern of dots and which corresponds to a character in said coded information; and
   c. means for recording a second framing pattern corresponding to one of said plurality of tracks, said second framing pattern consisting of an alternating pattern of dots and the absence of dots aligned respectively with said plurality of columns in said matrix.

12. The system according to claim 11 wherein said means for recording said first framing pattern, said matrix and said second framing pattern comprise a plurality of light sources disposed adjacent to one another and transversely opposite to said marginal portion of said cinematographic film.

13. The system according to claim 12 further comprising a write-in device for selectively lighting certain ones of said light sources.

14. The system according to claim 13 further comprising means for reading said coded information.

15. The system according to claim 14 wherein said means for reading comprises a plurality of photo-sensitive elements disposed opposite to said marginal portion of said film bearing said coded information.

16. The system according to claim 14 wherein said means for reading comprises a camera for scanning said marginal portion.

17. The system according to claim 14 further comprising means for synchronizing the reading of said coded information and movement of said film.

18. The system according to claim 14 further comprising means for recognizing and identifying combinations of dots inscribed on said film which corresponds to various characters of said coded information.

19. The system according to claim 18 wherein said means for recognizing comprises:
   a. an image memory connected to said means for reading for decoding signals from said means for reading;
   b. computer means connected to said image memory; and
   c. display means for displaying said decoded signals responsive to said computer means.

20. A strip of film having coded information inscribed in a marginal portion thereof comprising:
   a. a first framing pattern comprising a unique pattern of dots disposed perpendicular to the length of the film;
   b. a matrix of dots comprising a plurality of columns and a plurality of tracks, said plurality of columns being transversely positioned with respect to the length of the film and said plurality of tracks being parallel with respect to the length of the film, each of said plurality of columns consisting of a predetermined pattern of dots which is different from said unique pattern of dots and which corresponds to a character in said coded information; and
   c. a second framing pattern corresponding to one of said plurality of tracks, said second framing pattern consisting of a predetermined pattern of dots and the absence of dots aligned respectively with said plurality of columns in said matrix.

21. The strip of film according to claim 20 further comprising a first flag pattern consisting of a plurality of continuous drags between two perforations in said film when a camera using said film is started.

22. The strip of film according to claim 21 further comprising a second flag pattern consisting of a plurality of continuous drags between two perforations in said film when said camera is stopped.

* * * * *